United States Patent
Bohle, II et al.

(10) Patent No.: US 11,296,471 B2
(45) Date of Patent: Apr. 5, 2022

(54) MOTOR BRUSH QUICK CHANGE ASSEMBLY

(71) Applicant: ATI Industrial Automation, Inc., Apex, NC (US)

(72) Inventors: David John Bohle, II, Durham, NC (US); Sophia Katrina Davis, Durham, NC (US); Dustin Christopher Simons, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 130 days.

(21) Appl. No.: 16/547,710

(22) Filed: Aug. 22, 2019

(65) Prior Publication Data

US 2021/0057862 A1    Feb. 25, 2021

(51) Int. Cl.
*H01R 39/40* (2006.01)
*H01R 39/38* (2006.01)
*H02K 15/00* (2006.01)

(52) U.S. Cl.
CPC ....... *H01R 39/383* (2013.01); *H02K 15/0006* (2013.01)

(58) Field of Classification Search
CPC ...... H02K 5/148; H01R 39/40; H01R 39/383; H01R 39/385
See application file for complete search history.

(56) References Cited

U.S. PATENT DOCUMENTS

| 3,510,708 | A | * | 5/1970 | O'Connor | H01R 39/41 |
| | | | | | 310/242 |
| 3,864,803 | A | | 2/1975 | Ohmstedt et al. | |
| 4,110,651 | A | * | 8/1978 | Fagan | H02K 5/148 |
| | | | | | 310/239 |
| 4,366,404 | A | * | 12/1982 | Ziegler | H01R 39/40 |
| | | | | | 310/239 |
| 5,543,675 | A | | 8/1996 | Steiner | |
| 5,631,513 | A | * | 5/1997 | Coles | H01R 39/383 |
| | | | | | 310/239 |
| 5,717,272 | A | | 2/1998 | Gobled | |
| 7,034,430 | B2 | | 4/2006 | Cutsforth et al. | |
| 7,126,242 | B2 | | 10/2006 | Williams et al. | |
| 8,487,503 | B2 | | 7/2013 | Esenwein et al. | |

(Continued)

FOREIGN PATENT DOCUMENTS

| CN | 201204506 Y | 3/2009 |
| CN | 102138274 A | 7/2011 |

(Continued)

*Primary Examiner* — Dang D Le
(74) *Attorney, Agent, or Firm* — Coats & Bennett, PLLC (57) ABSTRACT

A motor brush quick change assembly that includes brush units and electrical spring contacts. The brush units include a carrier with a housing and a brush. The electrical spring contacts are connected to an electrical device. Each of the brush units is configured to be removably attached to the electrical device to contact one of the electrical spring contacts. The brush unit thus provide for both a mechanical and electrical connection to the electrical device. The brush units are configured to prevent the need for separate electrical leads that require separate attachment and detachment to the electrical device. This design provides for straightforward removal and replacement that can be performed by a robotic device or an operator.

18 Claims, 8 Drawing Sheets

(56) References Cited

U.S. PATENT DOCUMENTS 8,922,092 B2 12/2014 Cutsforth
9,735,505 B2 8/2017 Wendt et al.

FOREIGN PATENT DOCUMENTS

| CN | 105580217 | A  | 5/2016  |
|----|-----------|----|---------|
| DE | 69302356  | T2 | 10/1996 |
| DE | 69500895  | T2 | 2/1998  |
| FR | 3071975   | A1 | 4/2019  |

* cited by examiner

MOTOR BRUSH QUICK CHANGE ASSEMBLY

FIELD OF INVENTION

The present invention relates generally to a motor brush assembly and, more particularly, to a motor brush assembly configured to be quickly removed and replaced from an electrical device.

BACKGROUND

A brush in an electrical device passes electrical current between a stationary contact and moving contact surface. During use, the brush contacts against a conductive surface in the electrical device to provide for the electrical connection. The brush becomes worn down over time due to the relative movement between the brush and the conductive surface. Once the brush is reduced to below a predetermined size, the brush should be removed and replaced to ensure there is an adequate electrical connection.

The brush may be packaged in an assembly that is configured to be attached to the electrical device. The package can include a spring to apply a force that maintains the brush in contact with the conductive surface. The package also includes one or more electrical leads that supply power. During replacement of the package, a user is required to disconnect the electrical leads from the electrical device and disconnect and remove the package from the electrical device. Replacement of the new package includes connecting the electrical leads to the receptacle and mounting the package in the electrical device.

Connecting the disconnecting the electrical leads increases the time required to replace the package. The electrical device cannot operate when a brush is not installed and thus the downtime slows production and lessens the efficiency. Further, for an automated production facility, connecting and disconnecting the electrical leads may not be able to be performed by a robotic device. Instead, a trained technician is required to change out the package. This can further reduce the efficiency and increase the cost of the process.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect is directed to a motor brush quick change assembly for mounting within a receptacle of an electrical device. The motor brush quick change assembly comprises a plurality of flexible electrical spring contacts with each of the electrical spring contacts comprising an elongated shape with a first end configured to be mounted to the electrical device and a second end positioned outward within the receptacle. The motor brush quick change assembly also comprises a plurality of brush units with each of the brush units comprising a carrier configured to engage the electrical device and extend across the receptacle, an electrically conductive housing mounted to the carrier with the housing comprising a receptacle and a contact surface, and a brush mounted in the receptacle and with a first end extending outward from the receptacle away from the carrier with the brush contacting against and being electrically connected to the contact surface. Each of the brush units is sized to fit within one of the receptacles of the electrical device with the carrier sized to extend across the receptacle and for the contact surface of the housing to contact against the second end of the electrical spring contact.

In another aspect, the spring contact is constructed from beryllium copper.

In another aspect, the second end of the spring contact is a fold formed by overlapping sections.

In another aspect, the contact surface on the housing is spaced away from the receptacle.

In another aspect, the housing further comprises an arm that extends away from the receptacle and the contact surface is positioned on the arm.

In another aspect, the housing further comprises a biasing member that is mounted to the arm and that applies a biasing force to the brush.

In another aspect, the housing further comprises prongs that are positioned away from the receptacle and with the contact surface positioned away from the prongs.

One aspect is directed to a motor brush quick change assembly for electrically contacting against an electrically conductive surface within an electrical device. The motor brush quick change assembly comprises a plurality of flexible electrical spring contacts configured to be mounted to the electrical device in proximity to the conductive surface. The motor brush quick change assembly also comprises a plurality of brush units with each of the brush units comprising a carrier, an electrically conductive housing mounted to the carrier with the housing comprising a receptacle and a contact surface, and a brush mounted in the receptacle and with a first end extending outward from the receptacle away from the carrier and with the brush contacting against and being electrically connected to the contact surface. The brush units are configured to mount to the electrical device with the contact surface of the housing positioned to contact against the spring contact and the first end of the brush positioned to contact against the conductive surface.

In another aspect, the contact surface of the housing is positioned away from the receptacle such that the contact surface is spaced away from the brush.

In another aspect, the electrical spring contacts comprise a two-ply overlapping configuration at a second end that contacts against the contact surface of the housing and the first end comprise a single ply configuration.

In another aspect, the second end comprises a fold.

In another aspect, the carrier comprises one or more tabs that connect to the electrical device to maintain the brush unit mounted to the electrical device.

In another aspect, the brush and the housing extend outward from one side of the carrier.

One aspect is directed to a method of attaching a quick change brush unit to an electrical device. The method comprises: inserting the brush unit into a receptacle in the electrical device; contacting an electrical contact surface of a housing of the brush unit against an end of an electrical spring contact that is exposed within the receptacle; contacting a first end of a brush of the brush unit against an electrically conductive surface within an electrical device; securing a carrier of the brush unit with the electrical device and maintaining the position of the brush unit relative to the electrical device; and receiving electrical current at the electrical contact surface from the electrical spring contact and transferring the electrical current through the housing of the brush unit and into the brush while the first end of the brush is against the electrically conductive surface within the electrical device.

In another aspect, the method also comprises contacting the spring contact against the contact surface of the brush and flexing the spring contact.

In another aspect, the method also comprises contacting a fold in the electrical spring contact against the electrical contact surface of the housing.

In another aspect, the method also comprises contacting a biasing member against a second end of the brush and forcing the first end of the brush against the electrically conductive surface within the electrical device.

In another aspect, the method also comprises transferring the electrical current through the biasing member and into the brush.

In another aspect, the method also comprises sliding the brush through the receptacle and maintaining the brush electrically connected to the housing.

In another aspect, the brush unit is a first brush unit, the method further comprises contacting a second quick change brush unit to the electrical device and contacting a second electrical contact surface of the second brush unit against an end of a second electrical spring contact and receiving electrical current at the second electrical contact surface from the second electrical spring contact and transferring the electrical current through the second brush unit to the electrically conductive surface within the electrical device.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
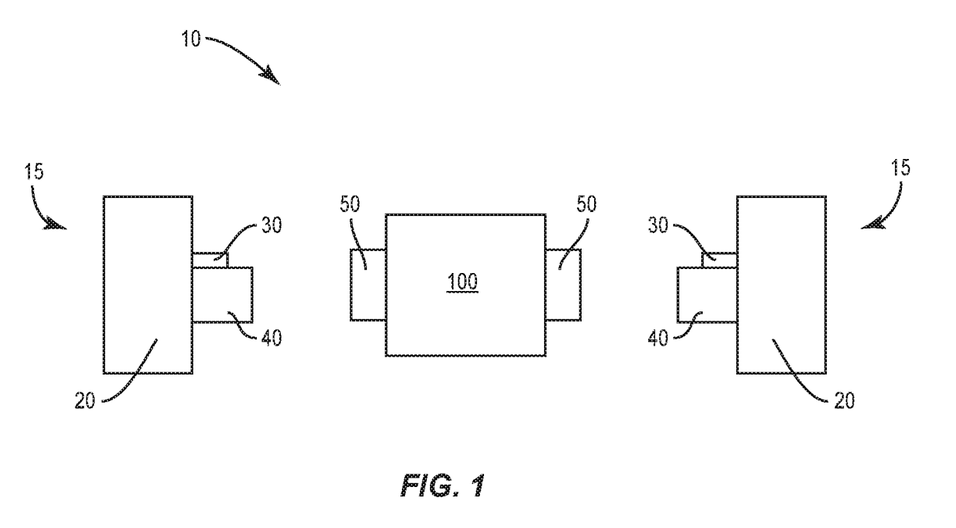
FIG. 1 is an exploded schematic view of a pair of brush units 15 positioned to engage with electrical spring contacts on an electrical device.

As schematically illustrated in FIG. 1, the present application is directed to a motor brush quick change assembly 10 that includes brush units 15 and electrical spring contacts 50 configured to be used with an electrical device 100. The brush units 15 include a carrier 20 with a housing 30 and a brush 40. The electrical spring contacts 50 are connected to the electrical device 100, such as an electric tool or generator. Each of the brush units 15 is configured to be removably attached to the electrical device 100 to contact one of the electrical spring contacts 50. The brush unit 15 thus provide for both a mechanical and electrical connection to the electrical device 100. The brush units 15 are configured to prevent the need for separate electrical leads that require separate attachment and detachment to the electrical device 100. This design provides for straight-forward removal and replacement that can be performed by a robotic device or operator.

FIG. 1 illustrates a pair of brush units 15 that each contact against an electrical spring contact 50 that is mounted to the electrical device 100. The electrical device 100 includes two or more brush units 15 to provide an electrical circuit. The different brush units 15 can be removed and replaced at the same or different times. Thus, the scope of the present application can be directed to a single brush unit 15 and electrical contact 100, or multiple brush units 15 and electrical contacts 100.

Figure 2:
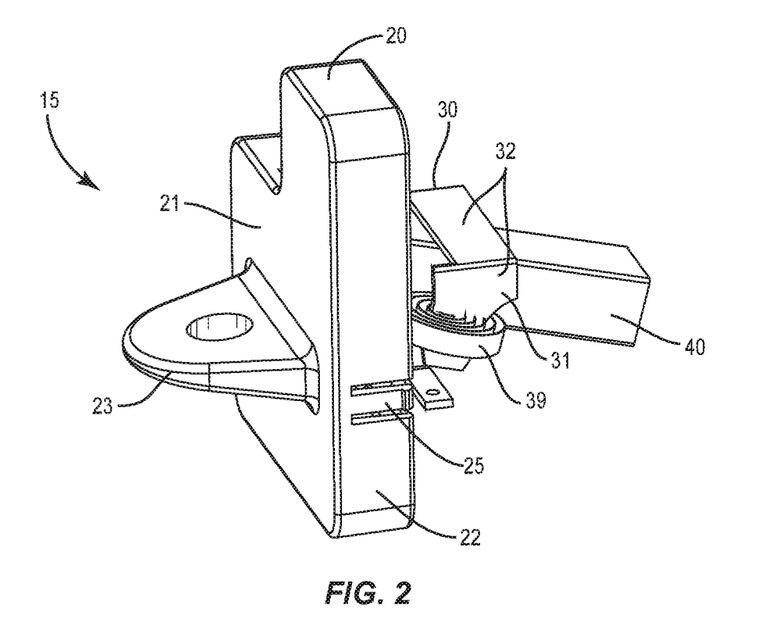
FIG. 2 is a rear perspective view of a brush unit.
Figure 3:
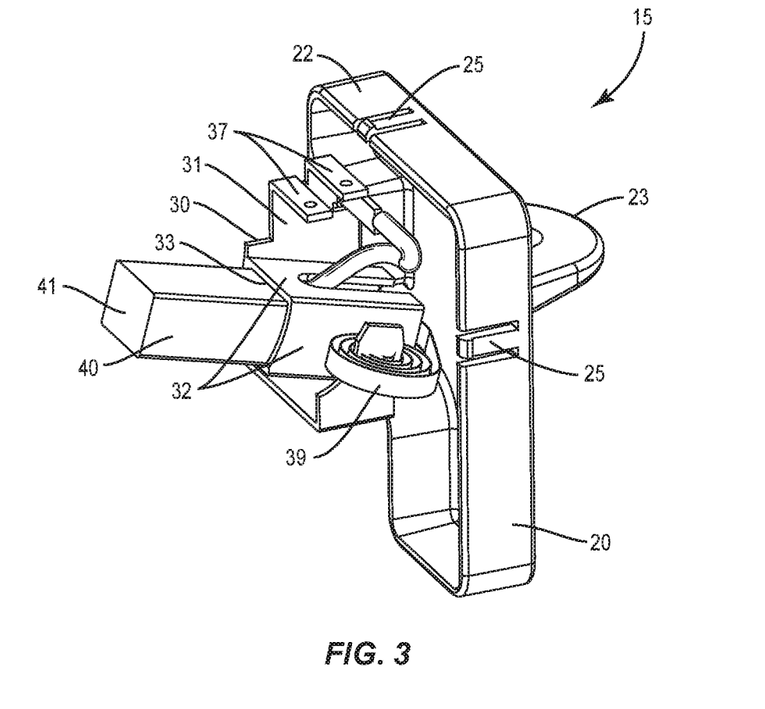
FIG. 3 is a front perspective view of a brush unit.
Figure 4:
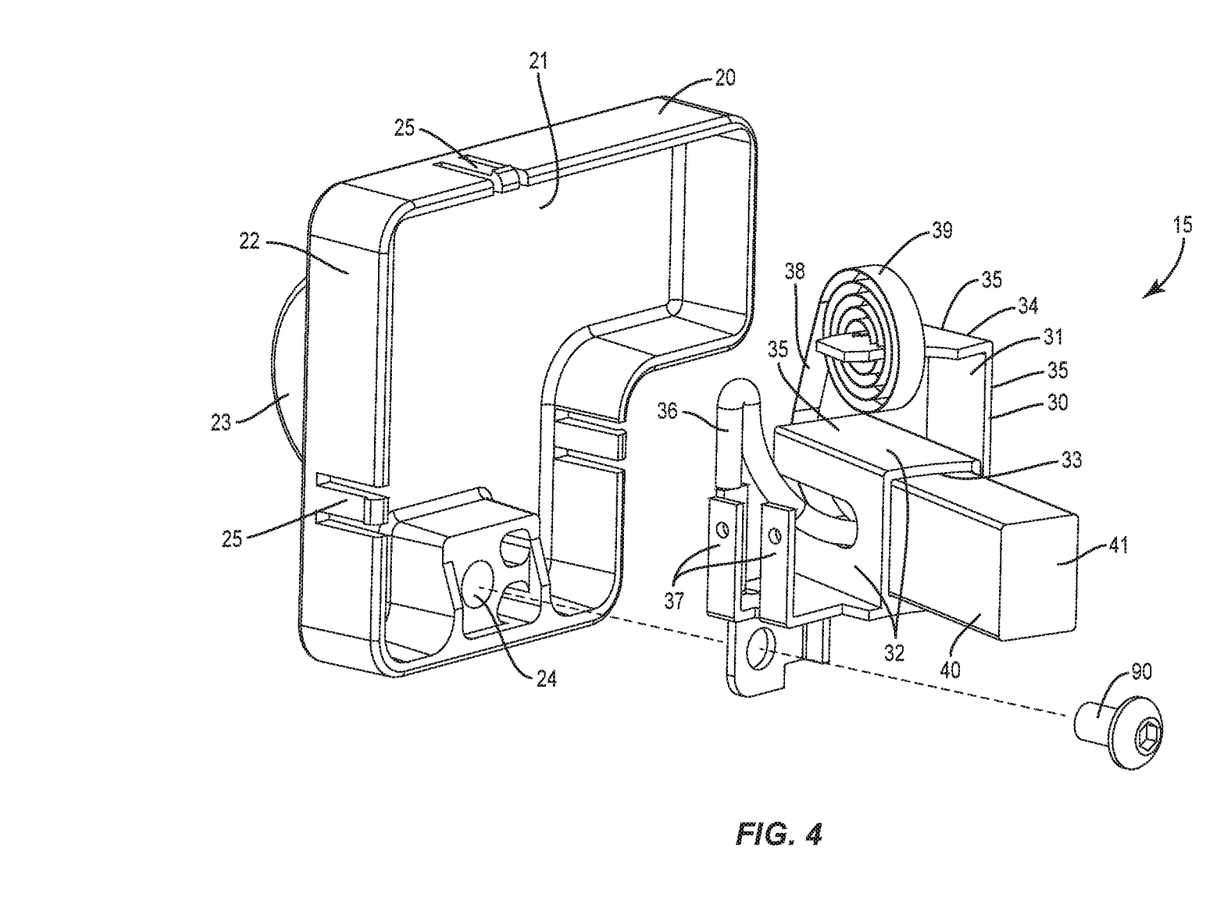
FIG. 4 is a partially-exploded perspective view of a brush unit.

FIGS. 2 and 3 illustrate front and rear views of a brush unit 15 configured to engage with an electrical device 100. FIG. 4 illustrates a partially exploded view of the brush unit 15. The brush unit 15 includes a carrier 20, housing 30, and brush 40. The carrier 20 is connected to the housing 30. The brush 40 is connected to and extends outward from the housing 30. The brush unit 15 is configured to maintain the housing 30 engaged with the electrical spring contact 50 when the brush unit 15 is mounted to the electrical device 100.

The carrier 20 supports and positions the housing 30 and thus the brush 40. The carrier 20 includes a back side 21 with an outer wall 22 that extends outward around the perimeter. A handle 23 extends outward from the back side 21 and forms a grip for a technician or robotic device to manipulate the brush unit 15 during removal and/or replacement. One or more tabs 25 are positioned along the outside of the outer wall 22. The one or more tabs 25 provide for a snap lock engagement with the electrical device 100. The back side 21 and outer wall 22 form a cavity that receives the housing 30. A receptacle 24 is positioned to receive a fastener 90 to secure the carrier 20 to the housing 30. The carrier 20 can be constructed from a non-conductive material. In one example, the carrier 20 is injection molded from various thermoplastic materials, including but not limited to polyethylene, polycarbonate, and polystyrene. In one example, the carrier 20 extends across a receptacle 101 in the electrical device 100 and protects the housing and brush 40 when mounted to the electrical device 100.

The housing 30 is mounted to the carrier 20 by one or more fasteners 90. The housing 30 supports and positions the brush 40 so it maintains contact with the electrical surface within the electrical device 100. The housing 30 also forms an electrical conduit between the brush 40 and the electrical spring contact 50 such that electrical current passes from the electrical spring contact 50, through the housing 30, and into the brush 40.

The housing 30 includes walls 32 that form a receptacle 33 sized to receive the brush 40. The walls 32 can extend partially or completely around the receptacle 33. In one example, the receptacle 33 includes a tubular shape with a sectional size and shape that matches the brush 40. In one example as illustrated in FIGS. 2, 3, and 4, the receptacle 33 and brush 40 each include a rectangular sectional shape. These components can also include various other sectional shapes. The receptacle 33 includes an open front through which the brush 40 extends. A back side of the receptacle 32 can be open or closed.

The housing 30 includes one or more contact surfaces 35 that are positioned to contact against the electrical spring contact 50 when the brush unit 15 is mounted to the electrical device 100. The contact surfaces 35 can be positioned at different locations along the housing 30, such as along the walls 32, and an arm 34 that extends from the walls 32. The housing 30 includes a body 31 can be constructed from a variety of different electrically conductive materials, including but not limited to stainless steel, galvanized steel, copper, and brass. A lead wire 36 includes a first end electrically connected to the housing 30 and a second end electrically connected to the brush 41. In one example, the second end is connected to an second end of the brush 40 that is opposite from the first end 41. The lead wire 36 transfers the electrical charge from the housing 30 to the brush 40.

The housing 30 includes a biasing member 39 that applies a biasing force to the brush 40 to maintain the contact with the electrical surface 103 within the electrical device 100. In one example, the biasing member 39 includes a coil that is attached to the arm 34. An extension 38 extends from the coil and contacts against an end of the brush 40. The biasing member 39 applies a force to maintain the first end 41 of the brush 40 positioned against the electrical surface 103.

In one example, the biasing member 39 also forms a section of the electrical conduit through which electrical current passes to the brush 40. The electrical current from the electrical spring contact 50 passes through the arm 34 and into the biasing member 39 where it passes to the brush 40. In another example, the brush unit 15 does not include a biasing member 39.

The brush 40 is sized to fit into the receptacle 32 of the housing 30. An end 41 of the brush 40 is exposed outward beyond the housing 30 and is positioned to contact against the conductive surface 103 of the electrical device 100. The opposing end is positioned in the receptacle 33. The brush 40 can be sized to slide within the receptacle 33. As the first end 41 is worn down by contact with the electrical surface 103, the brush slides within the receptacle 33 due to the force applied by the biasing member 39. In one example, the brush 40 remains in contact with the housing 30 during the movement to maintain the electrical connection. In another example, the brush 40 remains connected to the lead wire 36 to maintain the electrical connection. The brush 40 can be constructed from various materials including but not limited to graphite, carbon graphite, electrographite, metal graphite, silver graphite, resin graphite and other carbon materials.

As illustrated in FIGS. 2, 3, and 4, the housing 30 can include prongs 37. The prongs 37 are spaced away from the contact surface 35.

Figure 5:
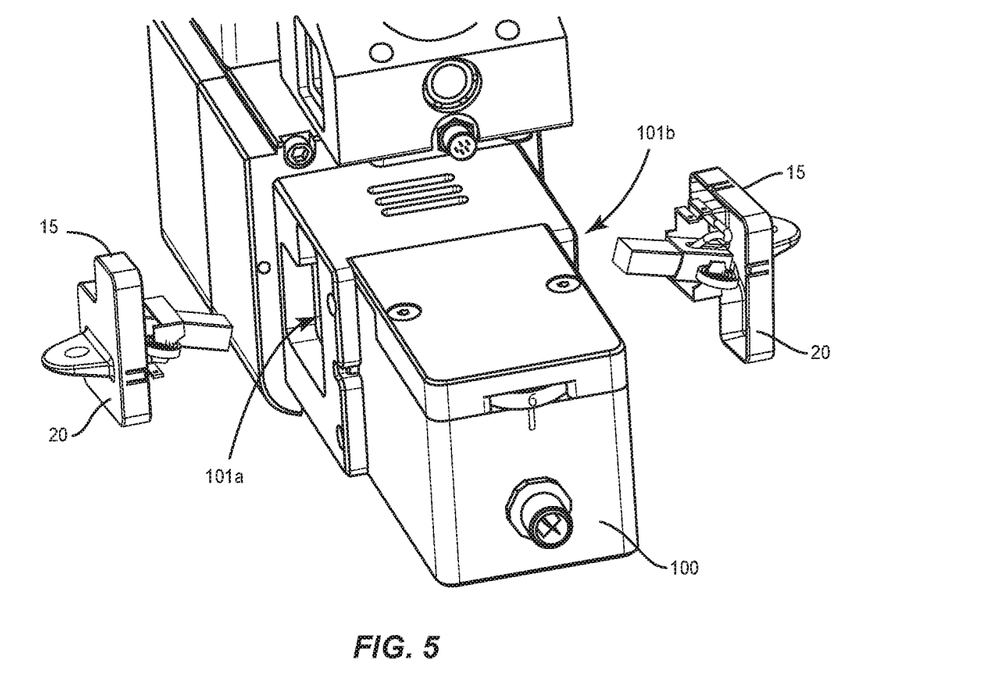
FIG. 5 is a partially-exploded perspective view of brush units positioned at receptacles of an electrical device.

FIG. 5 illustrates a pair of brush units 15 positioned to be attached to the electrical device 100. The brush units 15 are sized and shaped to fit within receptacles 101a, 101b of the electrical device 100. The carriers 20 are sized to extend across the receptacles 101a, 101b and mount to the electrical device 100. The carriers 20 protect the housing and brush 40 on the brush units 15, as well as the electrical spring contacts 50 within the receptacles 101a, 101b. In one example, the carriers 20 prevent the ingress of debris and/or fluids that could damage the brush units 15 and/or electrical device 100. In one example, two brush units 15 are needed to complete the electrical circuit within the electrical device 100.

Figure 6:
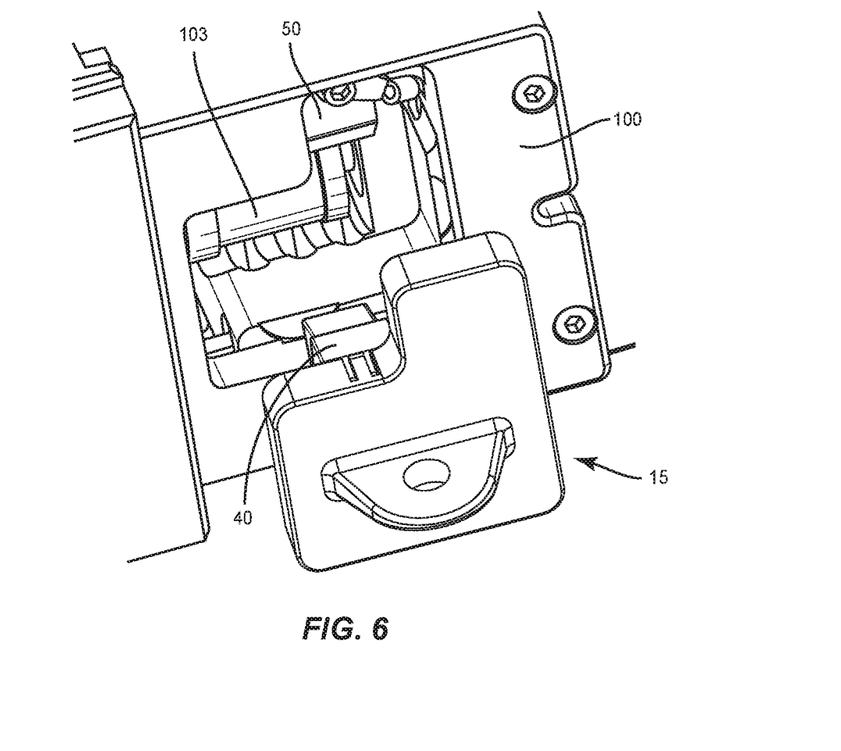
FIG. 6 is a side view of the brush unit of FIG. 6 positioned at a receptacle of the electrical device.

As illustrated in FIG. 6, the electrical spring contacts 50 are positioned and exposed at the receptacle 101a to contact against the brush unit 15. The shape and size of the electrical spring contacts 50 can vary. FIG. 6 includes an example in which the electrical spring contact 50 is positioned in proximity to the electrical surface 103 that is contacted by the brush 40. This positioning provides for the brushes 40 to make contact and supply the electrical connection when the brush units 15 are mounted to the electrical device 100.

Figure 7:
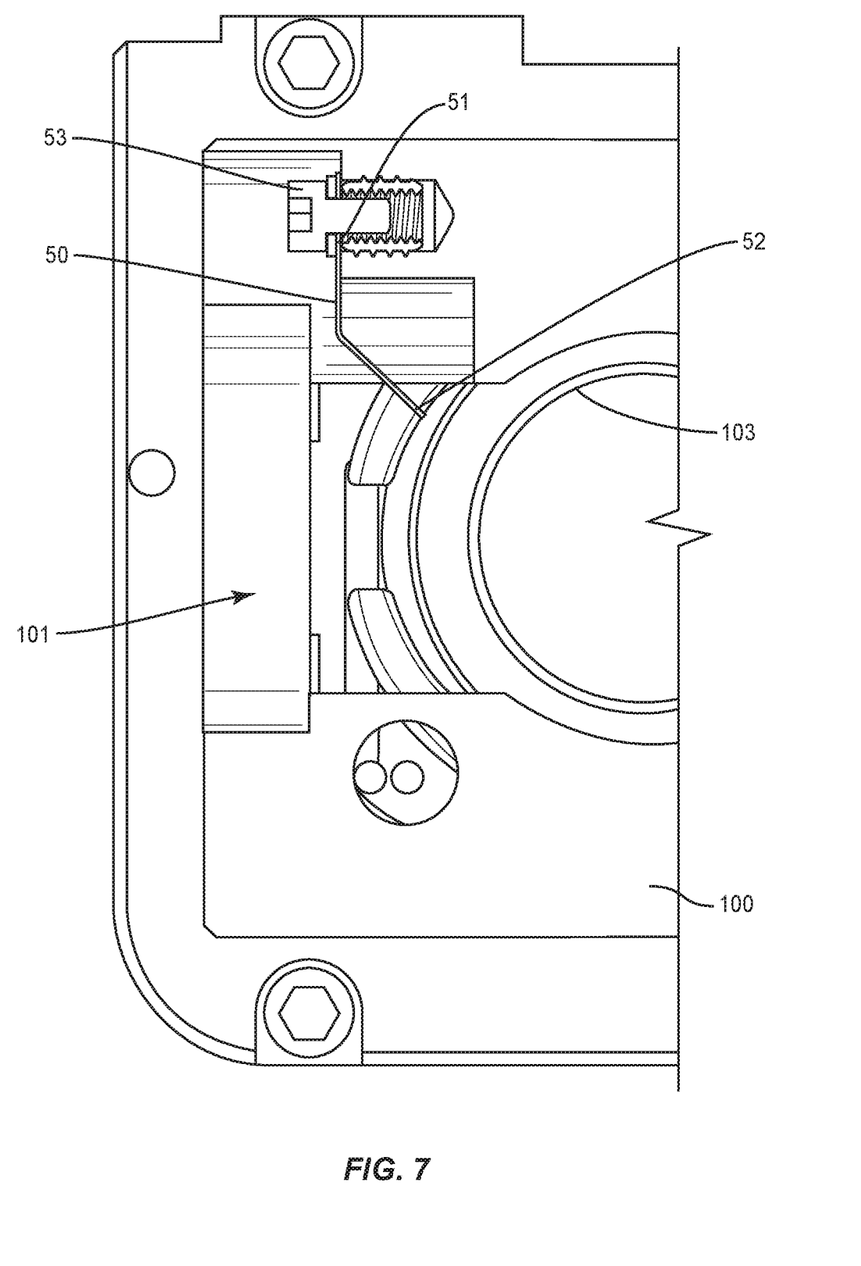
FIG. 7 is a side view of an electrical spring contact positioned in a receptacle of an electrical device.

As illustrated in FIG. 7, the electrical spring contacts 50 include a first end 51 and a second end 52. The first end 51 is secured by a fastener 53 to the electrical device 100. A ring terminal can be positioned at the first end 51 and connects to wires within the electrical device 100.

Figure 8:
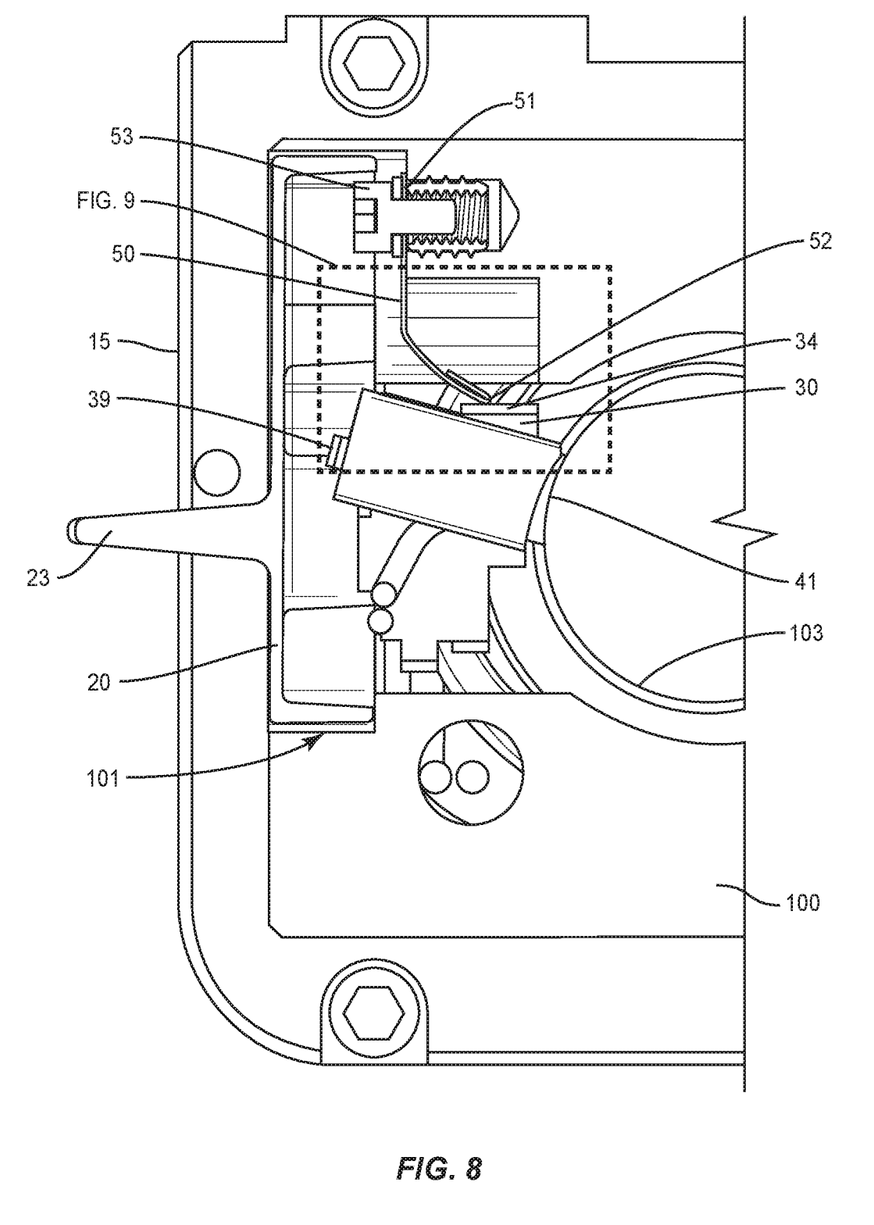
FIG. 8 is a side view of a brush unit mounted in a receptacle of an electrical device and with an electrical spring contact contacting against a housing.
Figure 9:
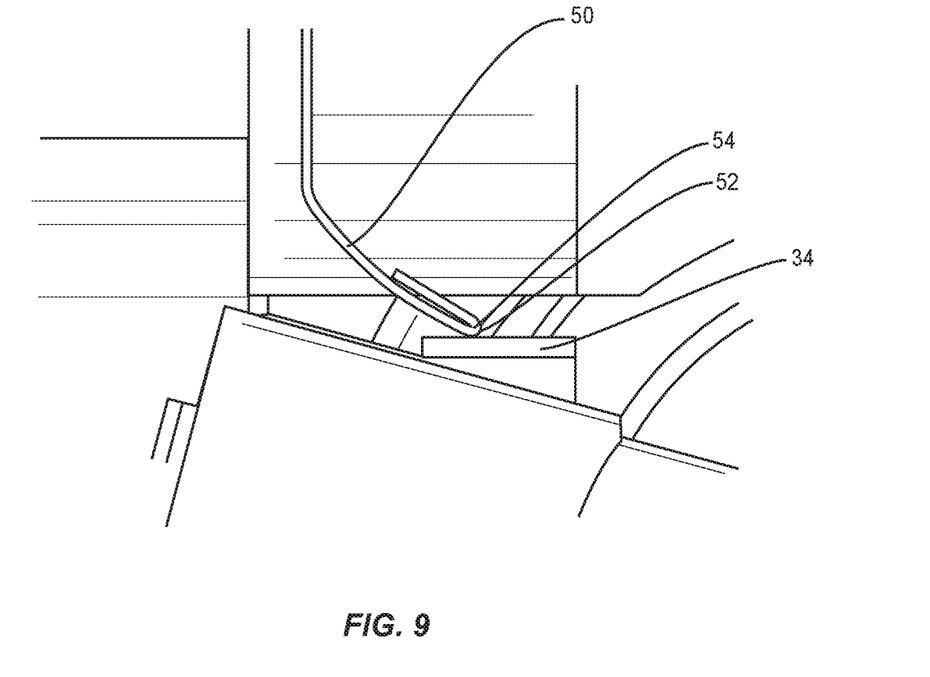
FIG. 9 is a close-up view of the electrical spring contact of FIG. 8 with the second end of the electrical spring contact contacting against the housing.

The second end 52 extends outward and is positioned in the receptacle 101. In one example as illustrated in FIGS. 8 and 9, the second end 52 is folded. In another example, the electric spring contact 50 is a single ply throughout the length. The electrical spring contact 50 is constructed from an electrically conductive material. One example includes a beryllium copper spring contact. Other materials include but are not limited to various electrically conductive materials capable of supplying power to the electrical device 100 including but not limited to silver and gold. In one example, the electrical spring contact 50 includes a plating, such as gold, silver, or tin. In one example, the electrical spring contact 50 is flexible and flexes when contacted by the brush unit 15. In another example, the electrical spring contact 50 does not flex during the contact.

FIG. 7 illustrates a close-up view of the electrical device 100 that includes a receptacle 101 sized to receive a brush unit 15. An electrical spring contact 50 is mounted to the electrical device 100 and exposed in the receptacle 101. The electrical device 100 includes an electrical surface 103 exposed in the receptacle 101 and configured to be engaged by the brush 40. In one example, the electrical surface 103 is a commutator portion of a rotor that receives an electrical charge through the brush unit 15 from the electrical spring contact 50 to electrify one or more windings carried by the rotor.

FIG. 8 illustrates the brush unit 15 mounted in the receptacle 101 of the electrical device 100. In one example, the tabs 25 on the carrier 20 engage with corresponding tabs on the electrical device 100 to provide a snap fit to maintain the positioning. The carrier 20 extends across the receptacle 101 and forms a shield to protect the housing 30, brush 40, electrical spring contact 50 and interior of the electrical device 101. The brush unit 15 is positioned with the first end 41 of the brush 40 in contact with the electrical surface 103. The biasing member 39 applies a force to bias the brush 40 into contact with the electrical surface 103. The second end 52 of the electrical spring contact 50 contacts against the housing 30. The electrical spring contact 50 is flexible and flexes to facilitate the contact with the housing 30.

FIG. 9 illustrates a close-up view of the second end 52 contacting against the housing 30. In this example, the second end 52 contacts against the contact surface 35 of the housing 30. The second end 52 can include a fold 54 with the distal section of the electrical spring contact 50 having a two-ply configuration. The proximal section of the electrical spring contact 50 can include a single-ply construction.

Figure 10:
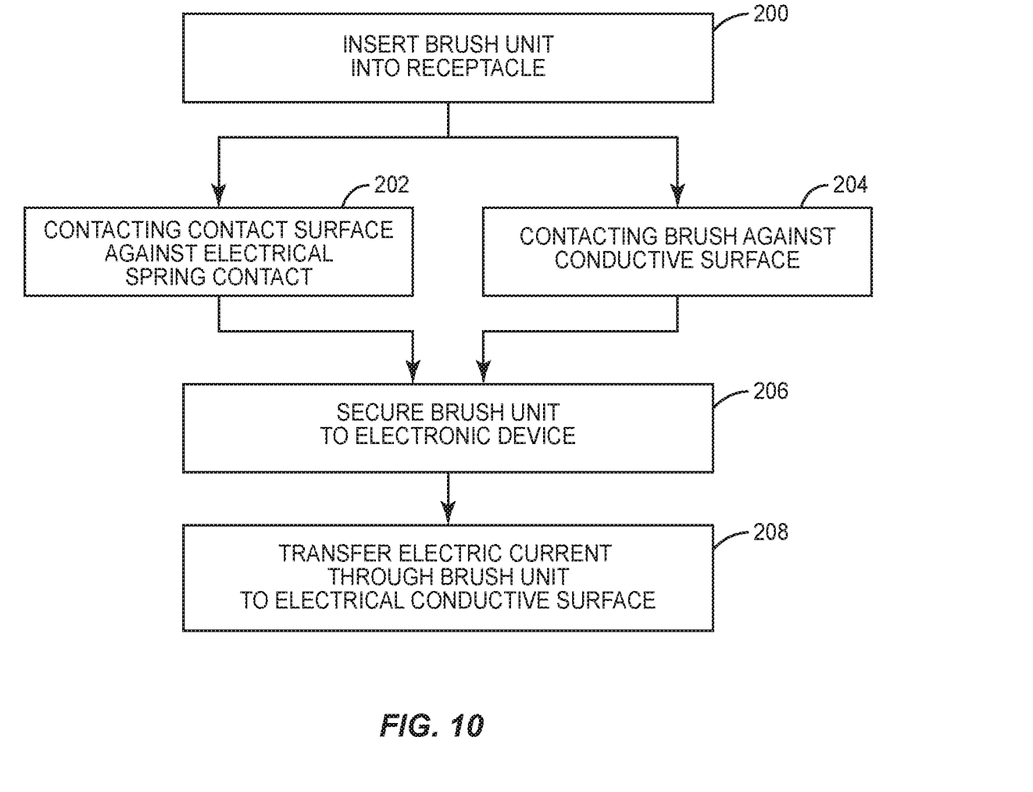
FIG. 10 is a flowchart diagram of a method of attaching a quick change brush unit to an electrical device.

FIG. 10 illustrates a method of attaching a brush unit 15 to an electrical device 100. The method includes inserting the brush unit 15 into a receptacle 101 in the electrical device 100 (block 200). The insertion provides for contacting an electrical contact surface 35 of a housing 30 against an end 51 of an electrical spring contact 50 that is exposed within the receptacle 101 (block 202). The insertion also provides for contacting a first end 41 of a brush 40 against an electrically conductive surface 103 within an electrical device 100 (block 204). The carrier 20 of the brush unit 15 is secured with the electrical device 100 to maintain the position of the brush unit 15 relative to the electrical device 100 (block 206). When the brush unit 15 is positioned in the receptacle 101, electrical current from the electrical device 100 is received at the electrical contact surface 34 from the electrical spring contact 50. The brush unit 15 is configured to transfer the electrical current through the housing 30 and into the brush 40 while the first end 41 of the brush 40 is against the electrically conductive surface 103 within the electrical device 100 (block 208). In one example, the electrical current is transferred from the housing 30, through the lead wire 36, and to the brush 40.

This method provides for installing a single brush unit 15 to an electrical device 100. One or more additional brush unit 15 can be installed in a similar manner. In one example, multiple brush units 15 are required to be mounted to the electrical device 100 to complete an electrical circuit to provide for operation of the device 100.

The brush units 15 can be used in a wide variety of electrical devices 100. Examples include but are not limited to electrical tools (e.g., drills, saws, grinders, generators), and household appliances.

For simplicity and illustrative purposes, the present invention is described by referring mainly to an exemplary embodiment thereof. Numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A motor brush quick change assembly for mounting within a receptacle of an electrical device, the motor brush quick change assembly comprising:
   a plurality of flexible electrical spring contacts, each of the electrical spring contacts comprising an elongated shape with a first end configured to be mounted to the electrical device and a second end positioned outward within the receptacle;
   a plurality of brush units, each of the brush units comprising:
      a carrier configured to engage the electrical device and extend across the receptacle;
      an electrically conductive housing mounted to the carrier, the housing comprising a receptacle, an arm that extends away from the receptacle, and a contact surface positioned on the arm; and
      a brush mounted in the receptacle and with a first end extending outward from the receptacle away from the carrier, the brush being electrically connected to the contact surface;
   each of the brush units sized to fit within one of the receptacles of the electrical device with the carrier sized to extend across the receptacle of the electrical device and for the contact surface of the housing to contact against the second end of the electrical spring contact with a remainder of the electric spring contact spaced away from the contact surface.

2. The motor brush quick change assembly of claim 1, wherein the spring contact is constructed from beryllium copper.

3. The motor brush quick change assembly of claim 1, wherein the second end of the spring contact is a fold formed by overlapping sections.

4. The motor brush quick change assembly of claim 1, wherein the contact surface on the housing is spaced away from the receptacle.

5. The motor brush quick change assembly of claim 1, wherein the housing further comprises a biasing member that is mounted to the arm and that applies a biasing force to the brush.

6. The motor brush quick change assembly of claim 1, wherein the housing further comprises prongs that are positioned away from the receptacle and with the contact surface positioned away from the prongs.

7. A motor brush quick change assembly for electrically contacting against an electrically conductive surface within an electrical device, the motor brush quick change assembly comprising:
   a flexible electrical spring contact configured to be mounted to the electrical device in proximity to the conductive surface;
   a brush unit comprising:
      a carrier;
      an electrically conductive housing mounted to the carrier, the housing comprising a receptacle and a contact surface; and
      a brush mounted in the receptacle and with a first end extending outward from the receptacle away from the carrier and with the brush being electrically connected to the contact surface;
   the brush unit configured to mount to the electrical device with the contact surface of the housing positioned to contact against the spring contact and the first end of the brush positioned to contact against the conductive surface;
   wherein the contact surface of the housing is positioned away from the receptacle such that the contact surface is spaced away from the brush.

8. The motor brush quick change assembly of claim 7, wherein the electrical spring contact comprises a two-ply overlapping configuration at a second end that contacts against the contact surface of the housing and the first end comprises a single ply configuration.

9. The motor brush quick change assembly of claim 8, wherein the second end comprises a fold.

10. The motor brush quick change assembly of claim 7, wherein the carrier comprises one or more tabs that connect to the electrical device to maintain the brush unit mounted to the electrical device.

11. The motor brush quick change assembly of claim 7, wherein the housing and the brush extend outward from one side of the carrier.

12. A method of attaching a quick change brush unit to an electrical device, the method comprising:
    inserting the brush unit into a receptacle in the electrical device;
    contacting an electrical contact surface of a housing of the brush unit against an end of an electrical spring contact that is exposed within the receptacle with the contact between the contact surface and the electrical spring spaced away from a brush of the brush unit;
    contacting a first end of the brush of the brush unit against an electrically conductive surface within an electrical device;
    securing a carrier of the brush unit with the electrical device and maintaining the position of the brush unit relative to the electrical device; and
    receiving electrical current at the electrical contact surface from the electrical spring contact and transferring the electrical current through the housing of the brush unit and into the brush while the first end of the brush is against the electrically conductive surface within the electrical device.

13. The method of claim 12, further comprising contacting the spring contact against the contact surface of the brush and flexing the spring contact.

14. The method of claim 12, further comprising contacting a fold in the electrical spring contact against the electrical contact surface of the housing.

15. The method of claim 12, further comprising contacting a biasing member against a second end of the brush and forcing the first end of the brush against the electrically conductive surface within the electrical device.

16. The method of claim 15, further comprising transferring the electrical current through the biasing member and into the brush.

17. The method of claim 12, further comprising sliding the brush through the receptacle and maintaining the brush electrically connected to the housing.

18. The method of claim 12, wherein the brush unit is a first brush unit, the method further comprising contacting a second quick change brush unit to the electrical device and contacting a second electrical contact surface of the second brush unit against an end of a second electrical spring contact and receiving electrical current at the second electrical contact surface from the second electrical spring contact and transferring the electrical current through the second brush unit to the electrically conductive surface within the electrical device.

* * * * *